United States Patent

Rodriguez

[15] 3,690,182
[45] Sept. 12, 1972

[54] MEASURING SCOOP AND SPOON COMBINATION

[72] Inventor: Mercedes Rodriguez, 2947 Nashville Dr., San Jose, Calif. 95116

[22] Filed: Aug. 10, 1970

[21] Appl. No.: 62,554

[52] U.S. Cl. ............... 73/429, 215/DIG. 5, 220/22.3
[51] Int. Cl. ............................................. G01f 19/00
[58] Field of Search ......... 73/429, 426; 220/22.3, 41; 215/DIG. 5

[56] References Cited

UNITED STATES PATENTS

| | | | |
|---|---|---|---|
| 2,882,732 | 4/1959 | Cercone | 73/429 |
| 2,569,703 | 10/1951 | Weiland | 73/429 |
| 3,391,578 | 7/1968 | Connellis | 73/429 |
| 2,626,526 | 1/1953 | Chester | 73/429 |
| 2,389,530 | 11/1945 | Miner | 73/426 |
| 2,645,127 | 7/1953 | Parks | 73/429 |

*Primary Examiner*—Louis R. Prince
*Assistant Examiner*—Daniel M. Yasich

[57] ABSTRACT

A measuring device for household use. This device is provided with a cup portion which will receive a slide member which is held in place by the walls being grooved, the slide serving to define a definite unit of measurement. The device also includes a horizontal slide having a handle which may be used for leveling the contents of the cup and may be also used as a guide in measuring ingredients received within the cup portion of the device.

5 Claims, 3 Drawing Figures

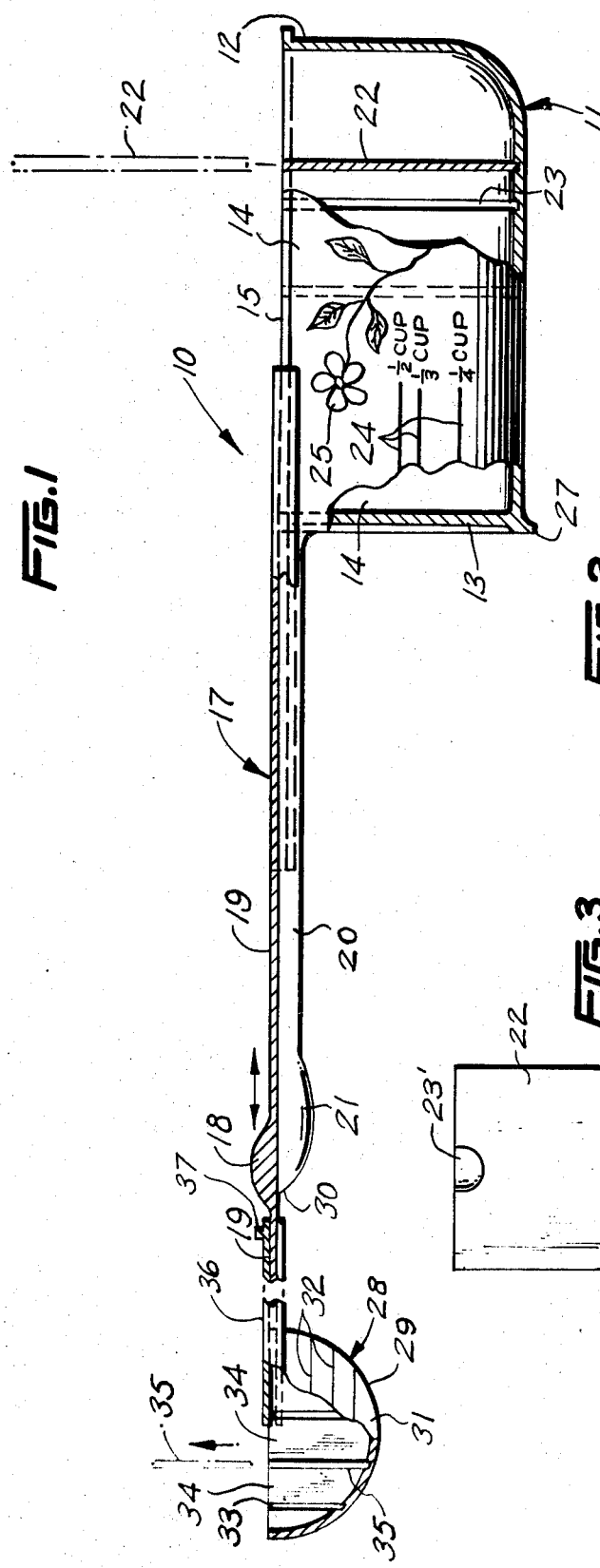
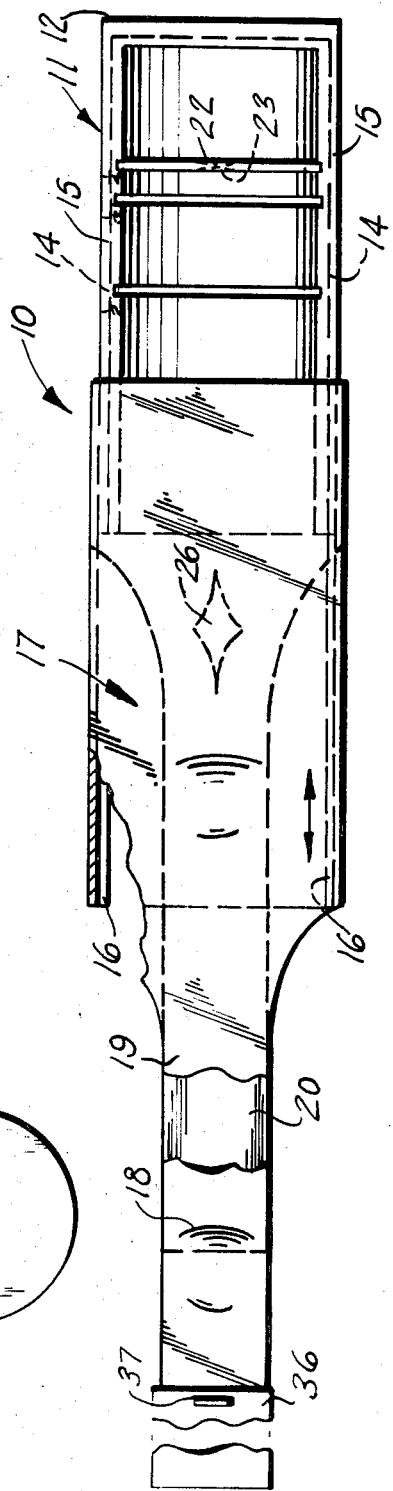

MEASURING SCOOP AND SPOON COMBINATION

This invention relates to vessels for measuring condiments and the like.

It is therefore the main purpose of this invention to provide a measuring spoon and scoop combination which may be used for measuring predetermined quantities of solids or liquids, various portions of the device being inscribed with graduation marks for indicating at what position the cup portion of the device should be filled to.

Another object of this invention is to provide a measuring scoop of the type described which will have flanges on the cup portion, the flanges slidably receiving a horizontal slide member, the horizontal slide member serving as a leveling means for dry materials and will also be used to position a certain portion of the cup for receiving a specific desired quantity of material.

A further object of this invention is to provide a scoop device which will have spaced apart grooves within the walls of the cup portion, the grooves receiving a vertical slide member, the vertical slide member providing division means for obtaining a specific amount of material.

A still further object of this invention is to provide a device of the type described which will have a raised portion on the horizontal slide and will have a depression on each side of the vertical slide, the depressions and the raised portion providing easy finger grip means for operating the slides and flange means on the cup portion of the device allows for the operation and retention of the horizontal slide member.

Other objects of the present invention are to provide a measuring scoop which is simple in design, inexpensive to manufacture, rugged in construction, easy to use and efficient in operation.

These and other objects will be readily evident upon a study of the following specification and the accompanying drawing, wherein:

FIG. 1 is a side view of the present invention shown in elevation and partly broken away;

FIG. 2 is a top plan view of FIG. 1 and shown partly broken away; and

FIG. 3 is a face view of the vertical slide member of the scoop shown removed from the invention and shown in elevation.

According to this invention, a measuring scoop and spoon combination 10 is shown to include a hollow cup 11 made of plastic, aluminum or other suitable material. Cup 11 includes a front wall 12 and a rear wall 13 molded or formed simultaneously with side walls 14. At the upper extremity of cup 11 are formed outwardly extending flanges 15, one on either side of cup 11, the flanges 15 slidably receiving the grooves 16 of the horizontal slide member 17. Slide member 17 is provided with a raised portion 18 upon the upper side 19 of the slide to allow for easy manipulation thereof by the user.

The horizontal slide 17 is used to level off the solid ingredients received within cup 11 and is also used to serve as guide means for a given number or quantity of ingredients. Slide member 17 is slidable in a manner which herein after will be described. The handle 20 is also provided with a downwardly raised portion 21 for easily gripping and manipulating scoop 10. Raised portions 18 and 21 permit easy pushing against for moving slide 17 respective to handle 20. A vertical slide member 22 may be slidably placed into any one of the spaced apart grooves 23 of the side walls 14, thus providing partition means for picking up a wanted quantity of ingredients. A depression 23' on the upper extremity of both sides of vertical slide 22 provides easy finger gripping means for slide member 22 in order to lift it or lower it into any one of the plurality of grooves 23. Cup 11 of scoop 10 is also provided with a plurality of spaced apart graduations 24 which indicate the various divisions that are normally needed in measuring ingredients.

The side walls 14 of cup 11 may also be provided with various decorative designs 25, one of which is shown. And the top portion of the handle 20 of cup 11 also includes a decorative design 26.

Cup 11 is rounded at its bottom and is provided with a straight edge 27 allowing it to remain upright when placed upon a surface.

When the cup portion of scoop 10 is dipped into the package and is dipped until it is full, the horizontal slide member 17 is then urged forward to the end for levelling, after which scoop 10 is shaken to remove the ingredient. The scoop 10 is then removed from the package with the user's thumb on the raised portion 18, the slide member 17 is then pulled back and the contents of cup 11 may be emptied into a suitable vessel for mixing and the like.

It shall be noted that the end wall 13 is shown in position so that scoop 10 may be used for liquid measurements and with the rear wall 13 removed from cup 11 the device can serve more as a measuring device for solids, however, if the rear wall 13 is removed during the construction of cup 11 and the slide 22 is of the proper seating structure, scoop 10 may be also used for both liquid and dry measurements.

It shall be noted that a measuring spoon 28 terminates one end of slide 17 and the outside surface 29 serves as stop means for slide 17 against the end 30.

The side walls 31 of spoon 23 are provided with spaced apart graduations 32 for measuring liquids and grooves 33 define compartments 34 for the specific measuring of various quantities of solids when the vertical slide member 35 is placed in any of the desired grooves 33. The slide 35 is also similar to the slide 22 shown in FIG. 3 of the drawing.

A channeled slide 36 on slide 17 serves as leveling means for the solids received in spoon 28, and an extending lip 37 provides a means of operating slide 36.

It is to be noted, as shown in the drawing, that the slide 36 is slideable upon the slide 17, by opposite sides edges of slide 36 being wrapped around side edges of slide 17.

What I claim is:

1. A measuring scoop and spoon combination for household use, comprising in combination, an elongated handle integral at one end with a hollow cup for measuring larger amounts of dry granular of liquid ingredients, a transverse, removable vertical slide receivable within said cup providing partitioning means for sub-dividing said cup for measuring smaller quantities of ingredients, a first horizontal slide slideable upon said handle and upon an upper edge of said cup so that one end edge of said horizontal slide provides leveling means of granular ingredients within said cup or sub-divided portion of said cup, a measuring spoon integrally formed with an opposite end of said horizontal slide, and said opposite end of said horizontal slide extending beyond an opposite end of said handle, a second horizontal slide being slidable upon the extending said opposite end of said first horizontal slide, said second slide being slidable upon an upper edge of said spoon for leveling smaller amounts of ingredients measured on said spoon, said cup portion of said device being elongated in configuration and including a front wall, a rear wall, a pair of parallel side walls, and a rounded bottom wall, said walls defining compartment means for receiving liquid and solid ingredients with graduation marks on said walls for indicating various amounts of ingredients, the interior of said side walls and said bottom wall portion of said device being provided with grooves, said grooves slidably receiving said vertical slide member, said vertical slide member being placed in any one of said desired grooves, said vertical slide having a depression at its upper extremity on both faces of said vertical slide for easy finger gripping means for lowering or raising said vertical slide from within said grooves of said cup portion of said scoop and when said slide is in place a given quantity may be carried in the area defined by said vertical slide when it is in place.

2. The combination according to claim 1, wherein said vertical slide when it is in place in any one of said grooves of said cup is rendered flush with the top portion of said cup, the top portion defining a pair of outwardly extending flanges which serves as rail means for slidably receiving said horizontal slide member, said horizontal slide member including an elongated handle portion, said handle portion slidably engaging the flat top portion of the handle portion of said cup portion of said scoop.

3. The combination according to claim 2, wherein said horizontal slide member is provided with a raised portion, said raised portion serving as an abutment for the thumb in order to urge said horizontal slide forward over said cup or rearward over said cup, said first horizontal slide, when urged forward, serves to level off the solid contents received within said cup portion of said scoop and also serves as guide means for obtaining a desired amount of ingredients within said cup of said scoop.

4. The combination according to claim 3, wherein said handle portion beneath said handle portion of said horizontal slide is also provided with a raised portion, said raised portion providing easy gripping means for said handle of said cup in order to dip and cup into ingredients that are to be scooped.

5. The combination according to claim 4, wherein the lower extremity of the rear wall of said cup portion of said scoop is provided with a downwardly extension, the lower edge of which is flat so as to render said cup level when it is placed upon a flat surface in order to overcome the roundness of the rest of the structure of said cup.

* * * * *